United States Patent
Yribarren (10) Patent No.: US 11,197,569 B2
(45) Date of Patent: Dec. 14, 2021

(54) FOOD PEELER

(71) Applicant: Richard Joseph Yribarren, Gardnerville, NV (US)

(72) Inventor: Richard Joseph Yribarren, Gardnerville, NV (US)

( * ) Notice: Subject to any disclaimer, the term of this patent is extended or adjusted under 35 U.S.C. 154(b) by 0 days.

(21) Appl. No.: 16/921,592

(22) Filed: Jul. 6, 2020

(65) Prior Publication Data

US 2021/0007529 A1 Jan. 14, 2021

Related U.S. Application Data (60) Provisional application No. 62/872,218, filed on Jul. 9, 2019.

(51) Int. Cl.
*A47J 17/02* (2006.01)
*A47J 43/25* (2006.01)

(52) U.S. Cl.
CPC .............. *A47J 17/02* (2013.01); *A47J 43/25* (2013.01)

(58) Field of Classification Search
CPC . A47J 43/25; A47J 17/02; A01F 11/06; B24B 41/06; B24B 41/065
USPC ........... 30/121.5; 99/584–587; 451/552, 555, 451/556, 558
See application file for complete search history.

(56) References Cited

U.S. PATENT DOCUMENTS

| | | | | |
|---|---|---|---|---|
| 9,335 A * | 1/1836 | Carpenter | ................... | 30/121.5 |
| 14,259 A * | 2/1856 | Taylor | ................... | A01F 11/06 30/121.5 |
| 63,112 A * | 3/1867 | Siddle | ................... | A01F 11/06 30/121.5 |
| 80,362 A * | 7/1868 | Mills | ................... | A01F 11/06 30/121.5 |
| 89,001 A * | 4/1869 | Curryer | ................... | A01F 11/06 30/121.5 |
| 108,126 A * | 10/1870 | Finley | ................... | A01F 11/06 30/121.5 |
| 126,333 A * | 4/1872 | Rickards, Jr. | ........... | A01F 11/06 30/121.5 |
| 160,193 A * | 2/1875 | Hoover | ................... | A01F 11/06 30/121.5 |

(Continued)

FOREIGN PATENT DOCUMENTS

KR 19980012771 6/1998
KR 101273259 6/2013

OTHER PUBLICATIONS

English Translation of Abstract for KR101273259 retrieved on Jul. 7, 2020 from: "https://worldwide.espacenet.com/patent/search/family/047840740/publication/KR101273259B1?q=pn%3DKR101273259B1".

(Continued)

*Primary Examiner* — Jason Daniel Prone
(74) *Attorney, Agent, or Firm* — Sierra IP Law, P.C.; Mark D. Miller (57) ABSTRACT

A food peeler for peeling an outer layer of a foodstuff, is described. The food peeler can include several members having respective surfaces that appose each other. At least one of the apposing surfaces can have a texture. Relative movement between the members while a foodstuff is in direct contact with the apposing surfaces causes an outer layer of the foodstuff to be peeled and removed from a core of the foodstuff. Other embodiments are also described and claimed.

22 Claims, 6 Drawing Sheets

(56) References Cited

U.S. PATENT DOCUMENTS

| | | | | |
|---|---|---|---|---|
| 163,377 A * | 5/1875 | Hunter | A01F 11/06 | 30/121.5 |
| 235,253 A * | 12/1880 | Kanne | A01F 11/06 | 30/121.5 |
| 265,995 A * | 10/1882 | Towns | A01F 11/06 | 30/121.5 |
| 274,588 A * | 3/1883 | Gordon | A01F 11/06 | 30/121.5 |
| 294,488 A * | 3/1884 | Matthews | A01F 11/06 | 30/121.5 |
| 598,792 A * | 2/1898 | Lehmann | A23N 1/003 | 30/121.5 |
| 735,513 A * | 8/1903 | Hoff | A01F 11/06 | 30/121.5 |
| 775,973 A * | 11/1904 | Hibbard | A47J 42/34 | 241/169 |
| 1,024,240 A * | 4/1912 | Wood | A01F 11/06 | 30/121.5 |
| 1,792,518 A * | 2/1931 | Stricker | A01F 11/06 | 30/121.5 |
| 1,894,493 A * | 1/1933 | Olson | A01F 11/06 | 30/121.5 |
| 2,220,485 A * | 11/1940 | Kashew | A47J 43/25 | 241/168 |
| 2,282,660 A * | 5/1942 | Lee | A01F 11/06 | 30/121.5 |
| 2,415,114 A * | 2/1947 | Skolrud | A01F 11/06 | 30/121.5 |
| 2,863,478 A * | 12/1958 | Drybread, Sr. | A01F 11/06 | 30/121.5 |
| 3,160,185 A * | 12/1964 | Retherford | A47J 17/02 | 30/123.6 |
| 3,529,644 A * | 9/1970 | Douglas | A47J 17/04 | 99/594 |
| 3,602,280 A * | 8/1971 | Hill | A23N 7/02 | 99/484 |
| 4,212,431 A * | 7/1980 | Doyel | B26D 3/283 | 83/167 |
| 5,305,527 A | 4/1994 | Holcomb | | |
| 5,513,562 A | 5/1996 | Moor | | |
| 5,573,803 A | 11/1996 | Omessi | | |
| 5,745,999 A * | 5/1998 | Zirkiev | A47J 43/25 | 30/279.6 |
| 6,128,823 A * | 10/2000 | Young | A47J 17/02 | 30/121.5 |
| D462,243 S * | 9/2002 | de Groote | D7/693 | |
| 6,637,684 B1 * | 10/2003 | Ross | A47J 42/14 | 241/169.1 |
| 6,945,486 B2 * | 9/2005 | Teng | A47J 19/06 | 241/169.1 |
| 6,951,297 B1 * | 10/2005 | Lopez | B65H 35/002 | 451/458 |
| 6,968,778 B2 | 11/2005 | Karyo | | |
| 7,331,538 B2 * | 2/2008 | Menze | B26D 3/283 | 83/856 |
| 7,690,285 B2 * | 4/2010 | de Buyer | B26D 3/283 | 83/247 |
| 7,837,137 B2 * | 11/2010 | Klotz | A47J 43/25 | 241/95 |
| 8,151,678 B2 * | 4/2012 | Mah | B26D 7/24 | 83/397 |
| D688,532 S * | 8/2013 | Ruzycky | D7/665 | |
| D694,073 S * | 11/2013 | Vincenti | D7/665 | |
| 8,990,988 B2 * | 3/2015 | Robbins | B26D 3/283 | 30/121.5 |
| 9,510,704 B2 | 12/2016 | Haimoff et al. | | |
| D779,291 S * | 2/2017 | Kassouni | D7/669 | |
| D791,554 S | 7/2017 | Hartshorn et al. | | |
| D793,179 S * | 8/2017 | Exley | D7/673 | |
| D807,714 S * | 1/2018 | Davies | D7/693 | |
| 10,448,664 B2 * | 10/2019 | Ramos | A47J 17/02 | |
| 10,631,679 B2 * | 4/2020 | Coyle | A47J 17/02 | |
| 2004/0200366 A1 * | 10/2004 | Koerselman | B26D 3/283 | 99/537 |
| 2006/0075870 A1 * | 4/2006 | Wangler | B26B 29/063 | 83/651 |
| 2008/0072772 A1 * | 3/2008 | Haimoff | A47J 17/18 | 99/586 |
| 2009/0165658 A1 * | 7/2009 | Schramm | A47J 19/06 | 99/510 |
| 2009/0243175 A1 * | 10/2009 | Shew | A47J 47/005 | 83/856 |
| 2012/0085249 A1 | 4/2012 | Kuan | | |
| 2014/0030408 A1 * | 1/2014 | Holcomb | A47J 17/02 | 99/585 |
| 2015/0028141 A1 * | 1/2015 | Federighi | A47J 43/044 | 241/169.2 |
| 2015/0075348 A1 * | 3/2015 | Wheeler | B26D 3/283 | 83/707 |
| 2018/0020863 A1 * | 1/2018 | Hauser | A47J 17/02 | 99/584 |
| 2019/0313857 A1 * | 10/2019 | Crowley | A47J 43/25 | |

OTHER PUBLICATIONS

English Translation of Abstract for KR19980012771 retrieved on Jul. 7, 2020 from: "https://worldwide.espacenet.com/patent/search/family/019465088/publication/KR19980012771U?q=pn%3DKR19980012771U".

* cited by examiner

FOOD PEELER

This application claims the benefit of U.S. Provisional Patent Application No. 62/872,218 filed on Jul. 9, 2019 which is incorporated herein by this reference in its entirety.

The present invention relates to food processing devices and related methods. More specifically, the present invention disclosure relates to devices and methods for peeling an outer layer of a foodstuff such as, without limitation, garlic cloves.

BACKGROUND OF THE INVENTION

Certain foodstuffs require processing prior to being cooked. For example, and without limitation, garlic cloves have a skin that must be removed from a garlic core prior to using the garlic core in a cooking dish. Removal of such skins may be accomplished manually or using a traditional cooking utensil, e.g., a knife, or semi-automatically using a food peeling device.

Food peeling devices for peeling garlic include cylindrical tubes fabricated from rubber materials. A user can peel a garlic clove by placing the garlic cloves into the rubber tube, squeezing the tube to compress the garlic, and rolling the tube along a hard surface to loosen and remove the garlic skin.

Existing food peeling devices do not lend themselves to high-volume processing. More particularly, loading and unloading garlic cloves from the rubber tubes described above, or removing spent skins from the rubber tube, can be time consuming. In addition, existing food peeling devices generally require the use of both hands, which does not allow other concurrent activities using the other hand, and which make such devices difficult to use by those with physical hand or finger impairments. Accordingly, a food peeler that is easy to load, unload, use and clean would be advantageous to a user by making food preparation easier, e.g., by reducing the time required to perform and/or clean up after a food preparation process or to clean up afterward, and by requiring only one hand to operate.

SUMMARY

The present invention provides methods and apparatus for quickly and efficiently removing peels or skins from foodstuffs. Embodiments of the invention include a base member suitable for use on a flat surface, and a second movable member that engages with the base member. The base member has an upper frictional surface that is provided in an elongated gap between two upwardly extending parallel sidewalls, the gap being open at both ends. The movable member includes a protruding section that is designed and sized to fit between the parallel sidewalls of the base member, and includes a lower frictional surface. The movable member may be engaged with the base member such that the frictional surfaces on the base member and movable member oppose each other, and either come close to or make contact with each other. In embodiments of the invention, the open ends of the gap allow the movable member to be slidably moved back and forth along the gap between the sidewalls of the base member, moving the frictional surfaces against each other.

In some embodiments, the frictional surfaces on the base and on the movable member may be the same or may be made of the same material, whereas in other embodiments these surfaces may be different or made of different materials. For example and without limitation, in some embodiments, different patterns of raised or rough areas may be provided on either or both of the frictional surfaces of the base and movable member. In some embodiments, only one of the apposing surfaces (either the base or movable member) is frictional. In some embodiments, rubber or rubber like materials may be provided on one or both of the base and/or movable member to provide the apposing frictional surfaces for these members. Suitable materials for the frictional surfaces include without limitation, rubber, latex, silicone, and the like. In other embodiments, the apposing surfaces on the base and/or movable member may be coated with resins or other materials that may partially or completely harden to provide rough frictional surfaces. For example, the frictional surfaces can be rough surfaces.

In some embodiments, the base member may be provided with one or more lower panels or lips that extend out from the base. These panels or lips provide stability to the base member while also providing a place where a user may hold the base in place while moving the movable second member back and forth. In some embodiments, a handle, grip or other similar structure may be provided on the base that may be engaged by a user to steady the base while the embodiment is in use. In other embodiments, a suction may be provided to temporarily adhere the base to a surface, such as a counter or table top. In other embodiments, a rubberized band may extend completely around the base member providing an upper frictional surface that opposes the movable member, and a lower frictional surface which prevents slippage of the base on a counter or table top.

In use, the base of an embodiment of the invention is provided on a flat surface such as a counter or table top, with an optional panel extending from the base toward the user. The user may place a hand or elbow on the panel to steady the base, or the panel may be engaged with or clamped to the table top. The user holds the movable second member in the other hand. Unpeeled foodstuffs (e.g., cloves of garlic, pinion nuts, pine nuts) may be placed on the frictional surface of the base between the parallel sidewalls of the particular embodiment. For some foodstuffs such as pine nuts and the like, the nuts may first be impacted or stricken with the user's palm or some other convenient utensil to create a break in the outer skin of the foodstuff before placing it in the base. After the unpeeled foodstuffs are placed on the base, in some embodiments, the second movable member is inserted into the gap, pressed against the foodstuffs, and moved back and forth. This causes the foodstuffs to be trapped under pressure between the upper surface of the base and the lower surface of the movable member, where either or both of the surfaces are frictional. The oscillating motion of the second member in the gap causes the foodstuffs to roll between the frictional surfaces of the base and the movable member, having the effect of removing the peels, skins or outer layers therefrom. Once these outer layers have been removed, the second movable member is taken away, exposing the peeled foodstuffs and the removed peels. The peels may ordinarily be removed from the base by rinsing the base under a stream of water or by gently blowing the peels away, leaving the peeled foodstuffs available for use.

The above summary does not include an exhaustive list of all aspects of the present invention. It is contemplated that the invention includes all devices, systems, and methods that can be practiced from all suitable combinations of the various aspects summarized above, as well as those disclosed in the Detailed Description below and particularly pointed out in the claims filed with the application. Such combinations have particular advantages not specifically recited in the above summary.

It is therefore an object of the invention to provide methods and apparatus for quickly and easily removing the outer layers of foodstuffs.

It is a further object of the invention to provide methods and apparatus for removing the outer layers of foodstuffs that is easy and simple to clean and store between uses.

It is a further object of the invention to provide methods and apparatus for removing the outer layers of foodstuffs without damaging the foodstuff from which the outer layer has been removed.

It is a further object of the invention to provide methods and apparatus for removing the outer layers of foodstuffs that are easy to operate using only one hand and by physically impaired persons.

Additional objects of the invention will be apparent from the detailed descriptions and the claims herein.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Embodiments describe a food peeler and methods for peeling or removing an outer layer of a foodstuff, e.g., shells, peels, skin of a garlic clove, outer layers of pine nuts or pinion nuts, etc. Although certain embodiments are described below with specific mention of peeling garlic cloves, it will be appreciated that the food peeler may be used in other applications, such as removing shells from peanuts or pine nuts. Accordingly, the scope of the claims below are not limited solely to a garlic peeler or a method of peeling garlic.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "forward" may indicate a first direction along a longitudinal axis of a food peeler. Similarly, "proximal" may indicate a second direction opposite to the first direction. Such terms are provided to establish relative frames of reference, however, and are not intended to limit the food peeler to a specific configuration described in the various embodiments below.

In an aspect, a food peeler has several members that move relative to each other, and more particularly, apposing surfaces of the members can move in a longitudinal direction relative to each other. One or more of the apposing surfaces can have a texture to increase friction between the textured surface and a foodstuff, e.g., a garlic clove, that is being peeled. For example, the texture can be a frictional surface, such as a rough surface. Accordingly, the foodstuff can be rolled between the apposing surfaces to cause an outer layer, e.g., a skin, of the foodstuff to loosen and/or remove from a core of the foodstuff.

Figure 1:
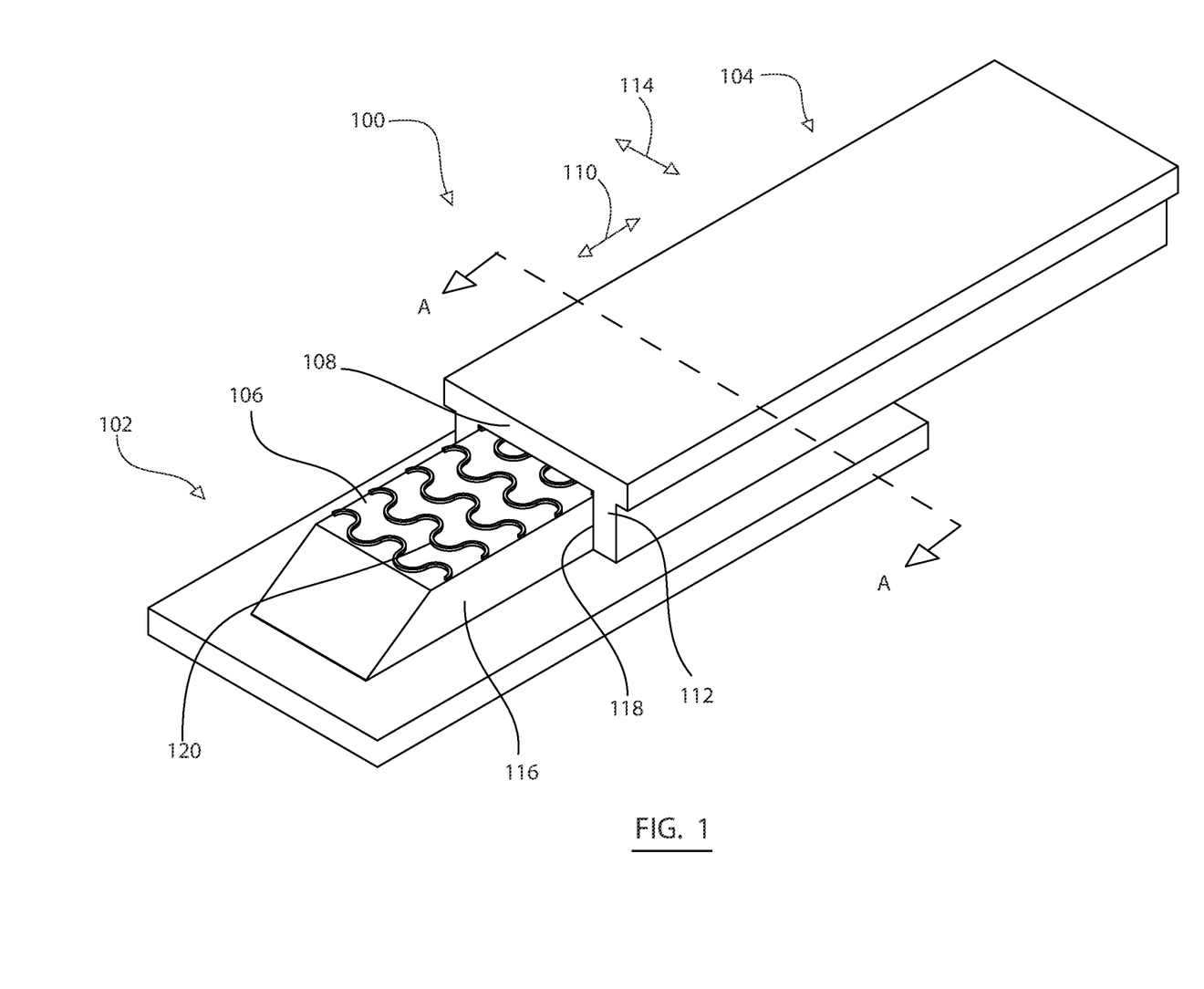
FIG. 1 is a perspective view of a food peeler, in accordance with an embodiment.

Referring to FIG. 1, a perspective view of a food peeler is shown in accordance with an embodiment. A food peeler 100 may be used to remove an outer layer from a core of a foodstuff. For example, the food peeler can be used to peel a garlic skin from a garlic core. In an embodiment, the food peeler may include a first member 102 and a second member 104. The first member can have a first inner surface 106, and the second member can have a second inner surface 108, which opposes the first inner surface. The members can move relative to each other, e.g., in a longitudinal direction 110, and thus, the apposing surfaces can face and move relative to each other.

The members of the food peeler can be operatively coupled to each other. For example, in addition to being capable of moving relative to each other in the longitudinal direction, relative movement between the members may be limited in one or more other directions. In an embodiment, one or more of the members have a constraint to limit movement of the members in a predetermined direction. For example, the second member can have a constraint 112 to limit movement of the first member relative to the second member in a transverse direction 114 when the second member is mounted on the first member. By contrast, the constraint 112 can allow movement of the first member relative to the second member in another direction, e.g., in a longitudinal direction to allow longitudinal movement between the members. In an embodiment, the transverse constraint can include surfaces of the members, e.g., a first lateral surface 116 of the first member and a second lateral surface 118 of the second member, that act as stops against each other to limit transverse movement. In other embodiments, mechanisms such as bearings, tracks, bands, or other constraints may be used to allow limited relative movement between the members of the food peeler.

One or more of the inner surfaces of the members can have a rough texture. For example, the first inner surface can have a first rough texture 120. A structure of the rough texture is described in more detail with respect to certain embodiments in FIGS. 5A-5B below. At this point, however, it will be appreciated that the rough texture can be rough in comparison to an adjacent surface. For example, the rough texture of the first inner surface may be more rough (have a higher average surface roughness) than the lateral surface 116 of the first member that slides against the lateral surface 118 of the second member.

Figure 2:
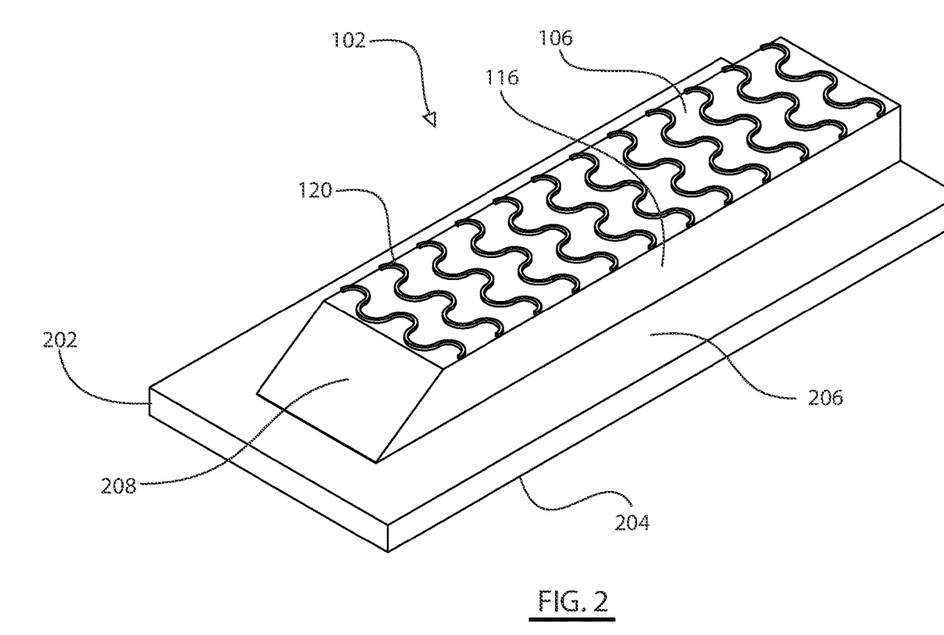
FIG. 2 is a perspective view of a first member of a food peeler, in accordance with the embodiment of FIG. 1.

Referring to FIG. 2, a perspective view of a first member of a food peeler is shown in accordance with an embodiment. The first member, in addition to the structural features described above, can include a base portion 202. The base portion can have a rectangular footprint and a thickness between a bottom surface 204 and a top surface 206. A rack portion 208 can extend upward from the base portion. The rack portion can include the first rough texture 120 and the first lateral surface 116, as described above. In an embodiment, the bottom surface 204 can be roughened, e.g., knurled, to increase friction between the base portion and an external surface, e.g., a table or a hand of a user.

Figure 3:
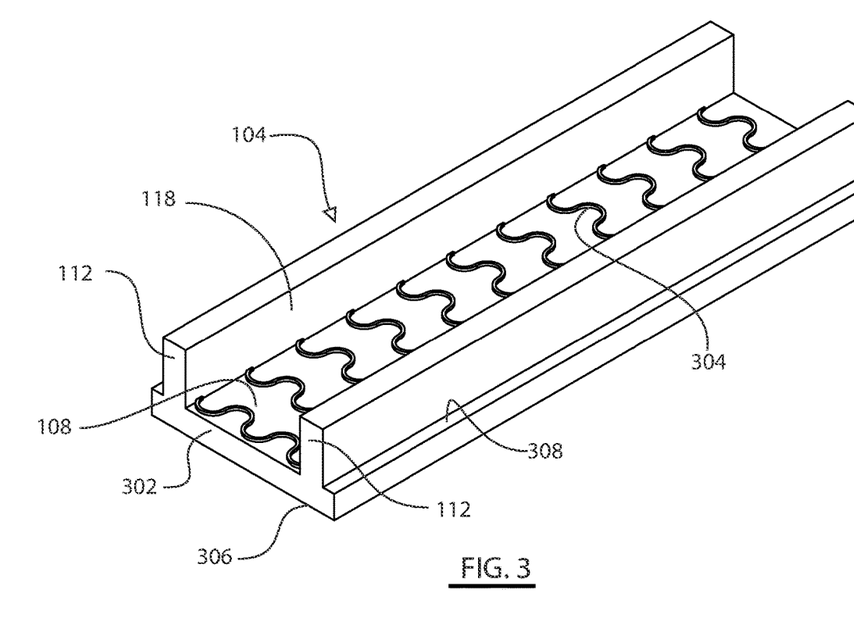
FIG. 3 is a perspective view of a second member of a food peeler, in accordance with the embodiment of FIG. 1.

Referring to FIG. 3, a perspective view of a second member of a food peeler is shown in accordance with an embodiment. The second member, in addition to the structural features described above, can include a wall portion 302. The wall portion can include the second inner surface 108. In an embodiment, the second inner surface 108, like the first inner surface 106, can have a second rough texture 304. For example, the second rough texture 304 may have a same structure and average surface roughness as the first rough texture 120. Alternatively, the first inner surface 106 may be smooth and/or have a different texture or average surface roughness than the second inner surface 108.

The wall portion can have a rectangular footprint and a thickness between a bottom surface 306 and a top surface 308. It is noted here that a "top" and "bottom" surface has been used to describe thicknesses of both the base portion of the first member and the wall portion of the second member. Such terminology, however, does not limit the use of the food peeler to a particular orientation. For example, it will be appreciated by comparison of FIG. 1 and FIG. 4 that the food peeler may be used with the second member above the first member, or vice versa.

One or more constraints 112 can extend upward from the wall portion. For example, the constraints 112 can be upwardly extending walls. The upwardly extending walls can be parallel sidewalls having lateral surfaces. More particularly, the constraints can include the second lateral surfaces 118, as described above. In an embodiment, the bottom surface 306 can be roughened, e.g., knurled, to increase friction between the wall portion and an external surface, e.g., a table or a hand of a user.

Figure 4:
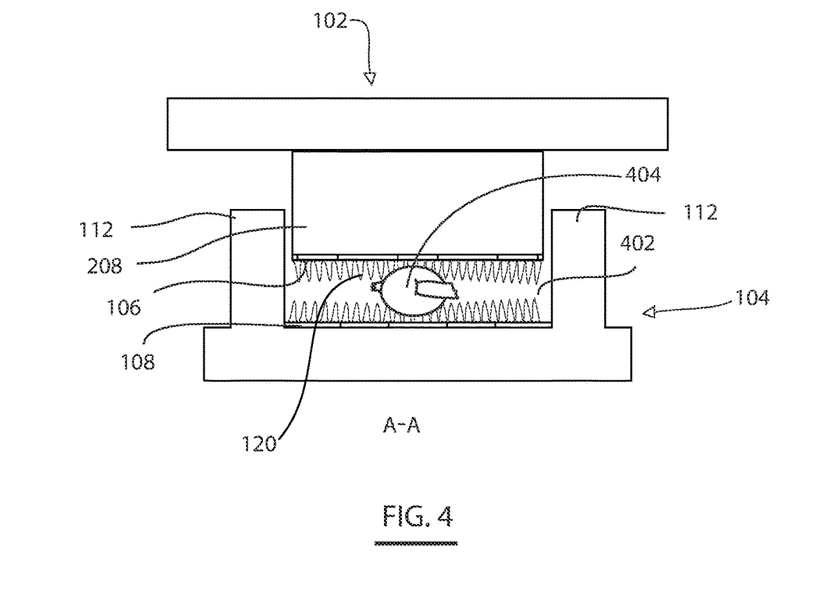
FIG. 4 is a cross-sectional view, taken about line A-A of FIG. 1, of a food peeler peeling a foodstuff, in accordance with an embodiment.

Referring to FIG. 4, a cross-sectional view, taken about line A-A of FIG. 1, of a food peeler peeling a foodstuff is shown in accordance with an embodiment. The first member may be mounted on the second member such that the first inner surface faces the second inner surface. For example, the surfaces can be planar surfaces, e.g., flat surfaces, facing each other across a peeling gap 402. Alternatively, the first inner surface and the second inner surface can be undulating surfaces (not shown). For example, a profile of the inner surfaces can be curvilinear along a cross-section taken in either the longitudinal direction or the transverse direction. The peeling gap can be used to receive a foodstuff 404, e.g., a garlic clove, for peeling. More particularly, when the foodstuff is sandwiched between the first inner surface and the second inner surface, and the members move relative to each other longitudinally, the flat or undulating surfaces can grip and roll the foodstuff to cause the skin to loosen and remove from the core.

When the members are mounted on each other, e.g., when the rack portion is cradled within and laterally between the constraints, the first member can move freely relative to the second member. More particularly, the members can move freely in at least one direction, e.g., the longitudinal direction. As described above, movement of the members can be limited in at least one direction, e.g., the transverse direction. In an embodiment, movement can be constrained in several directions. For example, the food peeler can include a stop (not shown). The stop can limit movement of the first member relative to the second member, e.g., in the longitudinal direction. The stop could be a band that is connected to the first member at a first end and to the second member at a second end. Accordingly, movement of the members can be limited by a length of the band. More particularly, when the members move sufficiently to place the band in tension, further movement in the longitudinal direction may be impeded by the stop.

Figure 5A:
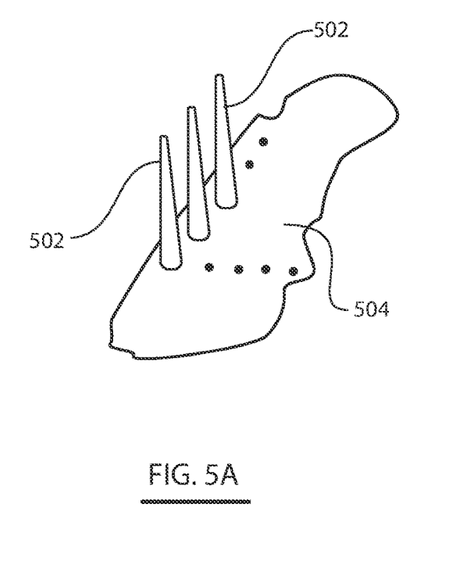
FIG. 5A is a detail view of a texture of a food peeler surface, in accordance with an alternative embodiment.

Referring to FIG. 5A, a detail view of a rough texture of a food peeler surface is shown in accordance with an embodiment. The rough texture of the inner surface(s), e.g., the first inner surface, can include several prongs 502. For example, the prongs can extend from a base surface 504 to provide the rough texture of the first inner surface. The rough texture can be integral to, e.g., monolithically formed with, the first member as shown in FIG. 1. Alternatively, the rough texture can be part of a separate component of the first member, e.g., a textural layer that is bonded to a smooth inner surface as shown in FIG. 4. The prongs may be slender. For example, each prong can have an aspect ratio of height to width of at least 5, e.g., 10 or more. The prongs may be flexible and durable. For example, each prong can be formed from a food-grade elastomer.

Figure 5B:
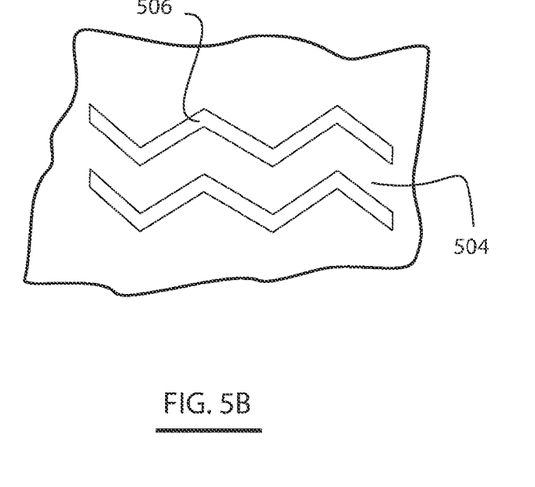
FIG. 5B is a detail view of a texture of a food peeler surface, in accordance with an alternative embodiment.

Referring to FIG. 5B, a detail view of a rough texture of a food peeler surface is shown in accordance with an embodiment. The rough texture of the inner surface(s), e.g., the first inner surface, can include several ridges 506. For example, the ridges can extend from a base surface 504 to provide the rough texture of the first inner surface. The rough texture can be integral to, e.g., monolithically formed with, the first member as shown in FIG. 1. Alternatively, the rough texture can be part of a separate component of the first member, e.g., a textural layer that is bonded to a smooth inner surface as shown in FIG. 4. The ridges may extend in the transverse direction. For example, the ridges can be treads that have a width in the transverse direction that is greater than a height in a vertical direction. Similarly, a width of the ridges in the longitudinal direction may be less than the width in the transverse direction.

The textured surface as described with respect to FIGS. 5A-5B can be used on the inner surface of either member of the food peeler. Furthermore, alternative textured surfaces may be contemplated within the scope of this description. More particularly, one skilled in the art will recognize that textured surfaces increase friction between the moving members and the foodstuff to allow the food peeler to more easily grip and roll the foodstuff, and thus, loosen and remove the outer layer from the core. For example, one or more of the textured surfaces may have a flat substrate surface coated by an abrasive material, e.g., a sandpaper-like structure. Accordingly, the description is intended to be illustrative and not limiting.

Figure 6:
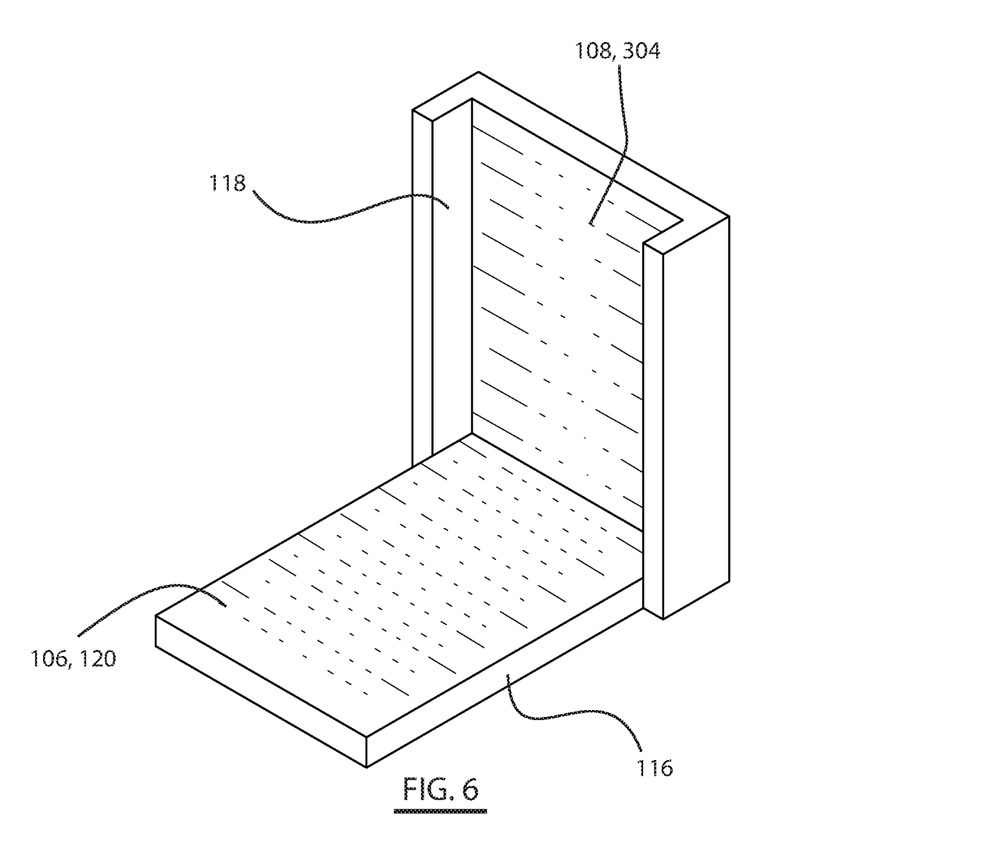
FIG. 6 is a perspective view of a food peeler having an alternative surface, in accordance with an alternative embodiment.

Referring to FIG. 6, a perspective view of a food peeler having an alternative rough surface is shown in accordance with an embodiment. The rough texture(s) of the apposing surfaces can be texturized flat polymer surfaces. For example, the surfaces can have a textured surface resembling the surface of a shoe grip. These exemplary surface characteristics are illustrated in the FIG. 6.

Figure 7:
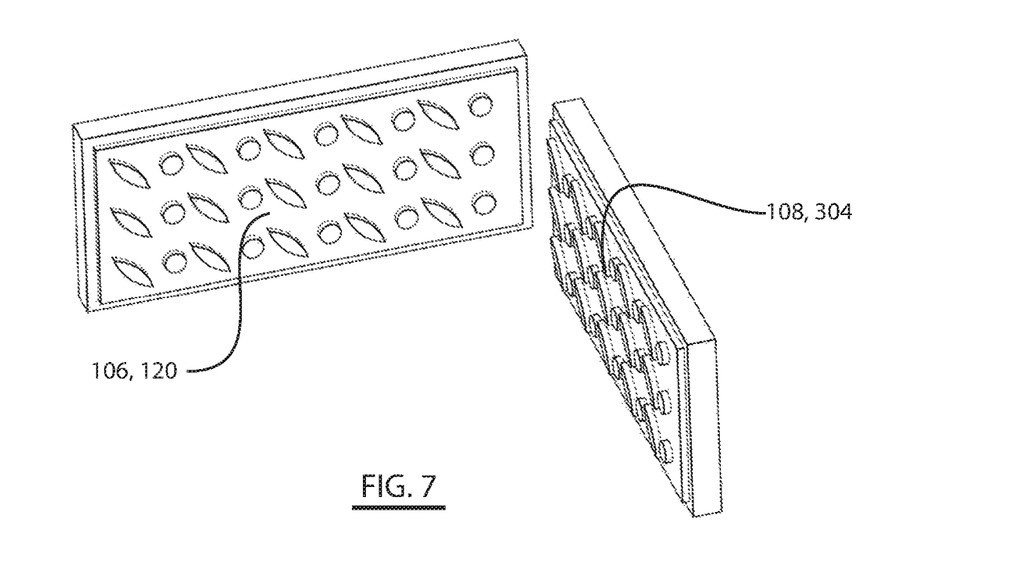
FIG. 7 is a perspective view of a food peeler having an alternative surface, in accordance with an embodiment.

Referring to FIG. 7, a perspective view of a food peeler having an alternative rough surface is shown in accordance with an embodiment. The rough texture(s) of the apposing surfaces can have a patterned grip pattern. For example, the surface may have raised bosses extending upward from a flat base surface. Each of the bosses can have a respective shape, e.g., an oval shape, a circular shape, a diamond shape, etc. The shapes can have similar or different sizes. For example, the bosses may include elliptical bosses having widths and/or heights that are greater than a diameter of circular bosses of the surface. The specific surface characteristics are illustrated in FIG. 7.

Also as shown in FIG. 7, the constraints that limit movement of the members 106, 108 relative to each other are optional. For example, the members may be respective flat plates having apposing surfaces that the foodstuff may be placed between and rolled to remove a skin.

Figure 8:
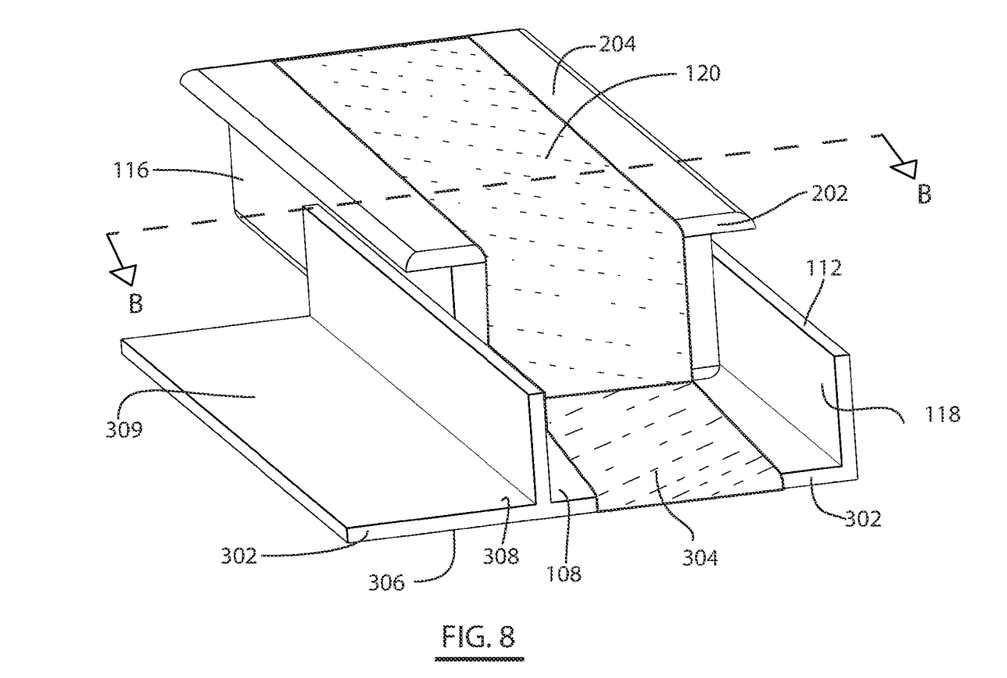
FIG. 8 is a perspective view of a food peeler, in accordance with an alternative embodiment.
Figure 9:
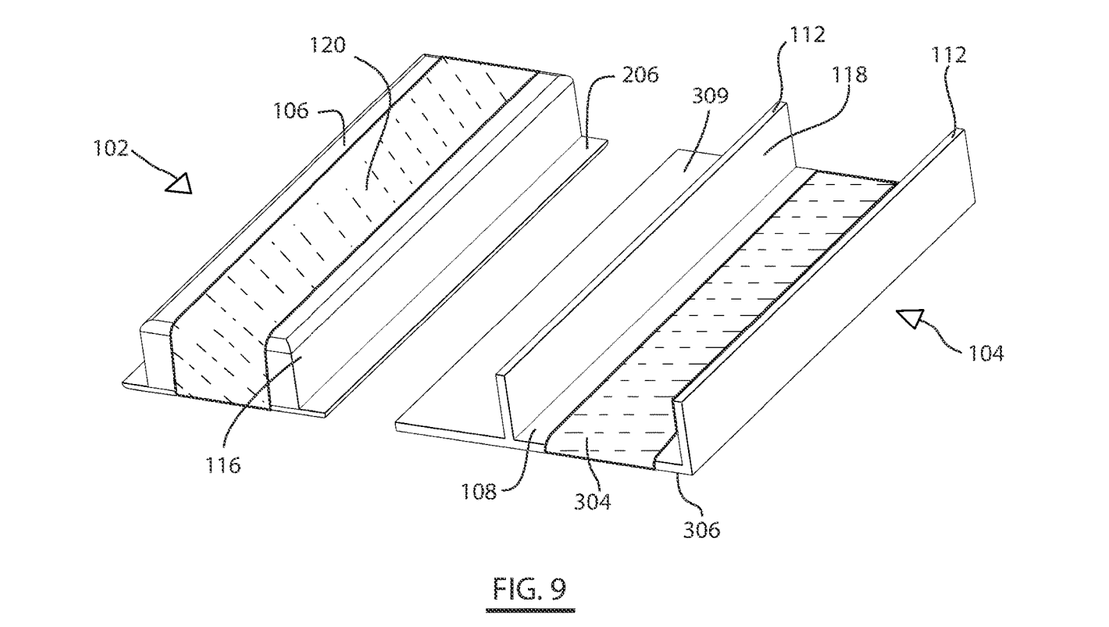
FIG. 9 is a disassembled view of the food peeler embodiment shown in FIG. 8.
Figure 10:
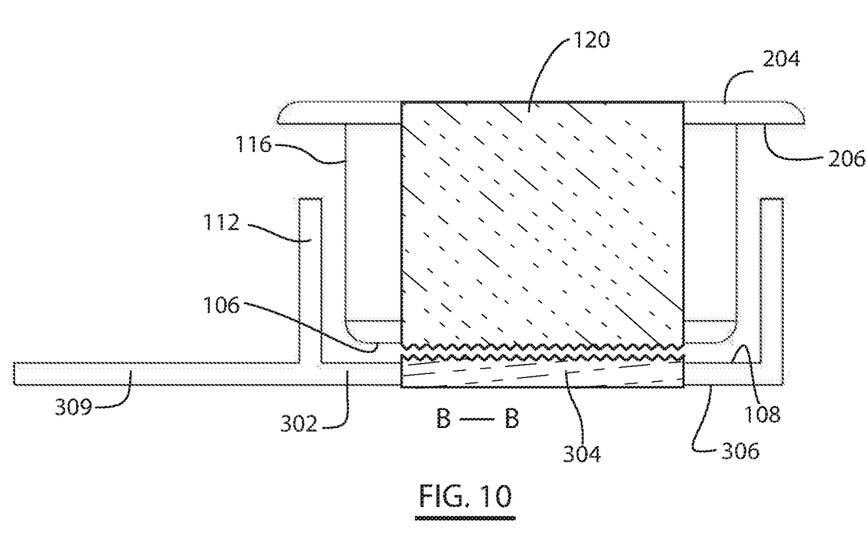
FIG. 10 is a cross-sectional view, taken about line B-B of FIG. 8, of a food peeler peeling a foodstuff, in accordance with an embodiment.

Referring to FIGS. 8-10, an alternative embodiment of a food peeler is shown. This embodiment resembles the inverted embodiment of FIG. 4 in which wall member 302 of the second member 104 is designed to be used on a flat surface, such as a table top. In these embodiments, in addition to a lower surface 306 and an upper surface 308, wall member 302 also includes an extension 309. It is noted here that a "lower" and "upper" surface has been used to describe thicknesses the wall portion of the second member 104. Such terminology, however, does not limit the use of the food peeler to a particular orientation. Advantageously, extension 309 of wall member 302 provides stability to the second member while also providing a place where a user may hold or clamp the second member in place while moving the first member 102 back and forth against the first member. In some embodiments, a handle, grip, suction cup, or other similar structure (not shown) may be provided on either the first member or the second member (whichever member is to be held in a stationary position), for engagement by a user to steady the stationary member while the other member is moved relative to and/or against it.

In some embodiments, such as that shown in FIGS. 8-10, a removable frictional or rough texture surface 120 may be provided on or around inner surface 106 of the movable member (in this case, member 102). In these embodiments, frictional surface 120 may be incorporated into a removable belt that may be made of a rubberized material, elastic, paper (such as sandpaper), or the like. Alternatively, the frictional surface 120 may be adhered directly to surface 106, or it may be provided in the form of a coating which, when dried, provides suitable friction. When a belt is used in these embodiments, the position of the belt on the movable member may be rotated after a number of uses, to as to expose a different portion of the belt for use as the apposing frictional surface. The belt may also be easily removed for cleaning, repair or replacement. It is to be appreciated that such a belt may be made of rubberized material, and may or may not also have additional frictional protrusions or structures thereon.

Similarly, in the embodiments shown in FIGS. 8-10, frictional surface 304 of the base 104 may also be removable, may be made of a rubberized material, elastic, paper, or the like. Surface 304 may be provided on or around inner surface 108 of the other member (in this case, member 104). Alternatively, the frictional surface 304 may be adhered directly to surface 108, or it may be provided in the form of a coating which, when dried, provides suitable friction. When a belt is used in these embodiments, the position of the belt on the base member may be rotated after a number of uses, to as to expose a different portion of the belt for use as the apposing frictional surface. The belt may also be easily removed for cleaning, repair or replacement. It is to be appreciated that such a belt may be made of rubberized material, and may or may not also have additional frictional protrusions or structures thereon. It is also to be appreciated that in these embodiments, belt 304 may extend along the lower surface 306 of member 104 providing a roughened, e.g., knurled, surface to increase friction between member 104 and an external surface, e.g., a tabletop or counter.

It is to be appreciated that surfaces 120 and 304 do not necessarily require protrusions or patters having substantial or even significant relief in comparison to surfaces 106 and 108. For example and without limitation, a simple nearly smooth rubberized material may be used for one or both of surfaces 120 and 304. Such a rubberized material will ordinarily provide sufficient friction to engage the outer layer of the foodstuff to be peeled causing such outer layer to be removed when sandwiched between one or two moving layers of such material. Of course, in other embodiments, if additional friction is desired for different foodstuffs, any suitable pattern of protrusions may be provided on one or both of surfaces 120 and 304 to engage the outer layer(s) of such foodstuffs for removal.

Advantageously, the food peeler described above can be easily loaded and unloaded. For example, a user may separate the members in the vertical direction (orthogonal to the longitudinal and transverse directions) to expose the rack portion and/or the channel between the constraints. A foodstuff can be placed into the channel or on the rack and the members may be mounted on each other to sandwich the foodstuff for peeling. After moving the members longitudinally to roll the foodstuff and peel the skin, the members may again be separated to lift the peeled core out of the channel for use in cooking. While separated, the members can be placed under running water or submersed in water to wash away the spent skins and clean the textured surfaces. In other embodiments, blowing air onto the separated members may be sufficient to dislodge and remove any waste or spent skins removed from the foodstuffs. The process can be repeated quickly and easily to increase food processing throughput compared to existing food peeling devices.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A food peeler system comprising:
a first member comprising a base having an elongated surface between a plurality of upwardly extending walls, wherein the surface and walls define a channel;
a second member comprising a section that fits between the walls of said first member, said section having an external surface thereon, wherein said second member engages with said first member for slidable movement back and forth along the channel between the walls of the first member such that said elongated surface of said first member and said external surface of said second member come close to each other;
a first rough texture provided on the elongated surface of said first member; and
a second rough texture provided on said external surface of said second member,
wherein each of the rough textures are configured to grip a food item and cooperate to roll the food item between the rough textures to peel an outer layer from the food item when the members come close together.

2. The food peeler system of claim 1 wherein the walls are parallel.

3. The food peeler system of claim 1 wherein said first rough texture is provided on a removable rubberized belt that extends along said elongated surface and around said first member.

4. The food peeler system of claim 1 wherein said second rough texture is provided on a removable rubberized belt that extends along said external surface and around said second member.

5. The food peeler system of claim 4 wherein said first rough texture is provided on a removable rubberized belt that extends along said elongated surface and around said first member.

6. The food peeler system of claim 1 further comprising a lateral extension on said base for steadying said first member when said food peeler is in use.

7. The food peeler of claim 1 further comprising a grip on said first member for steadying said first member when said food peeler is in use.

8. The food peeler of claim 1 further comprising a stop on one of the first member and the second member configured to limit movement of the first member relative to the second member.

9. The food peeler system of claim 1 wherein one of said first and second rough textures is removable.

10. The food peeler system of claim 1 wherein both of said first and second rough textures are removable.

11. The peeler system of claim 1 wherein said first rough texture is adhered to the elongated surface of said first member, and said second rough texture is adhered to the external surface of said second member.

12. A food peeler system comprising:
a first member comprising a base having an elongated surface between a plurality of upwardly extending walls, wherein the surface and walls define a channel;
a second member comprising a section that fits between the walls of said first member, said section having an external surface thereon, wherein said second member engages with said first member for slidable movement back and forth along the channel between the walls of the first member such that said elongated surface of said first member and said external surface of said second member come close to each other; and
a rough texture provided on a rubberized belt that extends around one of said first member or said second member, wherein said belt extends along one of said elongated surface of said first member or said external surface of said second member.

13. The food peeler system of claim 12 wherein a second rough texture is provided on a second rubberized belt that extends around the other of said first member and said second member, along the other of said elongated surface of said first member and said external surface of said second member.

14. A food peeler system comprising:
a first member comprising a base having an elongated surface between a plurality of upwardly extending walls, wherein the surface and walls define a channel;
a second member comprising a section that fits between the walls of said first member, said section having an external surface thereon, wherein said second member engages with said first member for slidable movement back and forth along the channel between the walls of the first member such that said elongated surface of said first member and said external surface of said second member come close to each other;
a first rubberized belt provided around said first member and along the elongated surface of said first member; and
a second rubberized belt provided around said second member and along the external surface of said second member.

15. The food peeler system of claim 14 wherein said first rubberized belt is removable.

16. The food peeler system of claim 14 wherein said second rubberized belt is removable.

17. The food peeler system of claim 14 wherein both of said rubberized belts are removable.

18. A method of removing an outer layer from a foodstuff comprising the steps of:
placing a foodstuff to be peeled onto an upwardly facing surface of a rubberized belt that extends around a first member and along an elongated surface of said first member between a pair of upwardly extending sidewalls that form a channel;
inserting a second member between said sidewalls, said second member having a second rubberized belt thereon which extends around said second member and along a downwardly facing external surface thereof, such that said second belt contacts said foodstuff sandwiching said foodstuff between said belts; and
moving said second member back and forth along the channel between said sidewalls such that said foodstuff is rolled between said belts causing an outer layer of said foodstuff to be removed.

19. A method of removing an outer layer from a foodstuff comprising the steps of:
placing a foodstuff to be peeled onto an elongated upwardly facing surface of a first member, said upwardly facing surface being between a pair of upwardly extending sidewalls that form a channel;
inserting a second member having a downwardly facing external surface between said sidewalls such that said downwardly facing surface contacts said foodstuff sandwiching said foodstuff between said upwardly facing surface and said downwardly facing surface wherein said upwardly facing surface and said downwardly facing surface each comprise a rough texture, said rough textures configured to grip said foodstuff and cooperate to perform a peeling of the foodstuff when the members come close together; and moving said second member back and forth along the channel between said sidewalls such that said foodstuff is rolled between said rough texture surfaces causing an outer layer of said foodstuff to be removed.

20. The method of claim 19 comprising a further step of impacting the foodstuff to be peeled to break a skin of the foodstuff prior to the inserting of the second member.

21. The method of claim 19 comprising further steps of:
removing said second member from said first member;
rinsing said first member using water to remove outer layers from said first member; and
removing said peeled foodstuffs from said first member.

22. The method of claim 19 comprising further steps of:
removing said second member from said first member;
using air pressure to blow said removed outer layers from said first member; and
removing said peeled foodstuffs from said first member.

* * * * *